United States Patent
Watanabe et al.

(10) Patent No.: US 6,804,442 B1
(45) Date of Patent: Oct. 12, 2004

(54) OPTICAL FIBER AND OPTICAL FIBER CABLE HAVING A FIRST JACKET LAYER AND A SECOND JACKET LAYER AND A COEFFICIENT OF THERMAL EXPANSION SELECTING METHOD

(75) Inventors: Hirohito Watanabe, Yotsukaido (JP); Keiji Ohashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/449,192

(22) Filed: Jun. 2, 2003

(30) Foreign Application Priority Data

Jun. 7, 2002 (JP) ........................................ 2002-167665
Jun. 7, 2002 (JP) ........................................ 2002-167680

(51) Int. Cl.[7] ................................................ G02B 6/02
(52) U.S. Cl. .................................................... 385/128
(58) Field of Search ............................... 385/123, 126, 385/127, 128, 102, 103, 107, 113, 109; 427/163.2, 407.1; 65/385, 430, 432; 264/494

(56) References Cited

U.S. PATENT DOCUMENTS

2002/0164141 A1 * 11/2002 Suhir ......................... 385/128
2003/0012536 A1 * 1/2003 Simomichi et al. .......... 385/128
2003/0210879 A1 * 11/2003 Oshio et al. ................. 385/128
2003/0215196 A1 * 11/2003 Bulters et al. ............... 385/123
2004/0022510 A1 * 2/2004 Suzuki et al. ................ 385/128

* cited by examiner

Primary Examiner—John R. Lee
Assistant Examiner—James P. Hughes
(74) Attorney, Agent, or Firm—Oblon, Spivak, McClelland, Maier & Neustadt, P.C.

(57) ABSTRACT

An improved optical fiber is described. The optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer. The mechanical factors of said fiber glass structure, the mechanical factors of said first jacket layer and the mechanical factors of said second jacket layer are selected in order that the Young's modulus of said first jacket layer is larger than the average tensile stress $(\sigma_r + \sigma_\theta + \sigma_z)/3$ as applied to said first jacket layer 5 while the resin temperature of UV curable resins largely falls from the temperature when the rigid UV curable resin starts hardening to the temperature when the hardening is finished.

18 Claims, 7 Drawing Sheets

FIG.8

| SOFT UV CURABLE RESIN | I | | | II | | | III | | |
|---|---|---|---|---|---|---|---|---|---|
| ENVIRONMENTAL TEMPERATURE (°C) | -20 | 0 | 20 | -20 | 0 | 20 | -20 | 0 | 20 |
| YOUNG'S MODULUS (MPa) | 2.5 | 1.1 | 1.0 | 130 | 100 | 70 | 110 | 50 | 50 |
| DESTRUCTIVE STRESS (MPa) | 2.7 | 1.2 | 1.1 | 150 | 110 | 75 | 120 | 70 | 60 |

FIG.9

| OPTICAL FIBER (CURE TEMP.) | 1A (100) | | | 1B (120) | | | 1C (140) | | | 1D (160) | | | 1E (180) | | | 1F (200) | | |
|---|---|---|---|---|---|---|---|---|---|---|---|---|---|---|---|---|---|---|
| ENVIRONMENTAL TEMPERATURE (°C) | -20 | 0 | 20 | -20 | 0 | 20 | -20 | 0 | 20 | -20 | 0 | 20 | -20 | 0 | 20 | -20 | 0 | 20 |
| YOUNG'S MODULUS (MPa) | 2.5 | 1.1 | 1.0 | 2.5 | 1.1 | 1.0 | 2.5 | 1.1 | 1.0 | 2.5 | 1.1 | 1.0 | 2.5 | 1.1 | 1.0 | 2.5 | 1.1 | 1.0 |
| $(\theta r + \theta 0 + \theta z)/3$ (MPa) | 1.4 | 0.4 | 0.2 | 1.9 | 0.6 | 0.4 | 2.4 | 0.8 | 0.6 | 2.9 | 1.0 | 0.8 | 3.4 | 1.0 | 1.0 | 3.8 | 1.4 | 1.2 |
| DAMAGE | ○ | ○ | ○ | ○ | ○ | ○ | ○ | ○ | ○ | × | ○ | ○ | × | × | ○ | × | × | × |

× THERE WERE FORMED VOIDS OR CRACKS.
○ THERE WERE NOT FORMED VOIDS OR CRACKS.

FIG.10

| OPTICAL FIBER | A | B | C | D | E |
|---|---|---|---|---|---|
| COEFFICIENT OF THERMAL EXPANSION OF THE SOFT UV CURABLE RESIN (/°C) $\alpha 1$ | $2\times10^{-4}$ | $5\times10^{-4}$ | $10\times10^{-4}$ | $7\times10^{-4}$ | $10\times10^{-4}$ |
| COEFFICIENT OF THERMAL EXPANSION OF THE RIGID UV CURABLE RESIN (/°C) $\alpha 2$ | $1\times10^{-4}$ | $2\times10^{-4}$ | $5\times10^{-4}$ | $1\times10^{-4}$ | $3\times10^{-4}$ |
| DAMAGE | ○ | ○ | ○ | × | × |

× THERE WERE FORMED VOIDS OR CRACKS.
○ THERE WERE NOT FORMED VOIDS OR CRACKS.

OPTICAL FIBER AND OPTICAL FIBER CABLE HAVING A FIRST JACKET LAYER AND A SECOND JACKET LAYER AND A COEFFICIENT OF THERMAL EXPANSION SELECTING METHOD

CROSS REFERENCE TO RELATED APPLICATIONS

The subject application is related to subject matter disclosed in the Japanese Patent Application No.2002-167680 filed in Jun. 7, 2002 in Japan and the Japanese Patent Application No.2002-167665 filed in Jun. 7, 2002 in Japan, to which the subject application claims priority under the Paris Convention and which are incorporated by reference herein.

BACKGROUND OF THE INVENTION

1. Field of the Invention

The present invention relates to an optical fiber and an optical fiber cable having a first jacket layer and the second jacket layer, and a method of manufacturing the same.

2. Description of the Related Art

Generally speaking, an optical fiber is composed of a fiber glass structure (bare fiber), a first jacket layer directly covering the external surface of the fiber glass structure, and a second jacket layer covering the external surface of the fiber glass structure through the first jacket layer.

The first jacket layer is made of a soft UV curable resin while the second jacket layer is made of a rigid UV curable resin. This is because, when an external force is applied to the optical fiber, the deformation of the entirety of the optical fiber is suppressed by the second jacket layer while the first jacket layer serves to suppress small deformation remaining after suppression by the second jacket layer for the purpose of protecting the fiber glass structure from the external force.

While the resin temperature of UV curable resins largely falls from the temperature when the rigid UV curable resin starts hardening to the temperature when the hardening is finished, the first jacket layer tends to thermally contract in the three-dimensional directions. Since the three-dimensional contraction of the first jacket layer is restricted between the fiber glass structure and the second jacket layer, the first jacket layer is subjected to tensile stress uniformly in the three-dimensional directions. In this case, the first jacket layer is subjected to tensile stress not only when the hardening is finished but also thereafter while the environmental temperature may be changed.

Accordingly, if the mechanical factors of the fiber glass structure, the mechanical factors of the first jacket layer and the mechanical factors of the second jacket layer are not appropriate, the average tensile stress of the three-dimensional tensile stress applied to the first jacket layer exceeds a predetermined destructive stress after hardening is finished resulting in voids or cracks in the first jacket layer. For this reason, the supporting condition of the fiber glass structure by the first jacket layer becomes unstable so that there occurs slight bending of the fiber glass structure resulting in transmission loss and the deterioration of the quality of optical fiber.

BRIEF SUMMARY OF THE INVENTION

In accordance with an aspect of the present invention, an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein the mechanical factors of said fiber glass structure, the mechanical factors of said first jacket layer and the mechanical factors of said second jacket layer are selected in order that the Young's modulus of said first jacket layer is larger than the average tensile stress ($\sigma_r+\sigma_\theta+\sigma_z$)/3 as applied to said first jacket layer 5 while the resin temperature of UV curable resins largely falls from the temperature when the rigid UV curable resin starts hardening to the temperature when the hardening is finished.

In accordance with another aspect of the present invention, an optical fiber cable in which a plurality of optical fibers are bundled, each of said optical fibers comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein the mechanical factors of said fiber glass structure, the mechanical factors of said first jacket layer and the mechanical factors of said second jacket layer are selected in order that the Young's modulus of said first jacket layer is larger than the average tensile stress ($\sigma_r+\sigma_\theta+\sigma_z$)/3 as applied to said first jacket layer 5 while the resin temperature of curable resins largely falls from the temperature when the rigid UV curable resin starts hardening to the temperature when the hardening is finished.

In accordance with a further aspect of the present invention, a method of manufacturing an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein the mechanical factors of said fiber glass structure, the mechanical factors of said first jacket layer and the mechanical factors of said second jacket layer are selected in order that the Young's modulus of said first jacket layer is larger than the average tensile stress ($\sigma_r+\sigma_\theta+\sigma_z$)/3 as applied to said first jacket layer 5 while the resin temperature of curable resins largely falls from the temperature when the rigid UV curable resin starts hardening to the temperature when the hardening is finished.

In accordance with a further aspect of the present invention, an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein, in the case where the Young's modulus of said soft curable resin is substantially small as compared to the Young's modulus of said rigid curable resin, the coefficient of thermal expansion a, of said soft curable resin and the coefficient of thermal expansion $\alpha_2$ of said rigid curable resin satisfy $$\alpha_2 > \frac{3}{2(1+\nu_2)}\left\{1-\left(\frac{R_0}{R_1}\right)^2\right\}\left\{\alpha_1 - \frac{1-2\nu_1}{\Delta T}\right\}$$

where $R_0$ is the radius of the fiber glass structure 3, $R_1$ is the outer radius of the first jacket layer 5, $\nu_1$ is the Poisson's ratio of the soft curable resin, $\nu_2$ is the Poisson's ratio of the rigid curable resin, and $\Delta T$ is the deviation of the resin temperature of said curable resins from the temperature when the rigid UV curable resin starts hardening to the temperature when the hardening is finished.

In accordance with a further aspect of the present invention, an optical fiber cable in which a plurality of optical fibers are bundled, each of said optical fibers comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein, in the case where the Young's modulus of said soft curable resin is substantially small as compared to the Young's modulus of said rigid curable resin, the coefficient of thermal expansion $\alpha_1$ of said soft curable resin and the coefficient of thermal expansion $\alpha_2$ of said rigid curable resin satisfy $$\alpha_2 > \frac{3}{2(1+v_2)}\left\{1-\left(\frac{R_0}{R_1}\right)^2\right\}\left\{\alpha_1 - \frac{1-2v_1}{\Delta T}\right\}$$

where $R_0$ is the radius of the fiber glass structure 3, $R_1$ is the outer radius of the first jacket layer 5, $v_1$ is the Poisson's ratio of the soft curable resin, $v_2$ is the Poisson's ratio of the rigid curable resin, and $\Delta T$ is the deviation of the resin temperature of said curable resins from the temperature when the rigid UV curable resin starts hardening to the temperature when the hardening is finished.

In accordance with a further aspect of the present invention, a method of manufacturing an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein, in the case where the Young's modulus of said soft curable resin is substantially small as compared to the Young's modulus of said rigid curable resin, the coefficient of thermal expansion $\alpha_1$ of said soft curable resin and the coefficient of thermal expansion $\alpha_2$ of said rigid curable resin are selected to satisfy $$\alpha_2 > \frac{3}{2(1+v_2)}\left\{1-\left(\frac{R_0}{R_1}\right)^2\right\}\left\{\alpha_1 - \frac{1-2v_1}{\Delta T}\right\}$$

where $R_0$ is the radius of the fiber glass structure 3, $R_1$ is the outer radius of the first jacket layer 5, $v_1$ is the Poisson's ratio of the soft curable resin, $v_2$ is the Poisson's ratio of the rigid curable resin, and $\Delta T$ is the deviation of the resin temperature of said curable resins from the temperature when the rigid UV curable resin starts hardening to the temperature when the hardening is finished.

In accordance with a further aspect of the present invention, an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is much less than the Young's modulus of said rigid curable resin, wherein the radius $R_0$ of said fiber glass structure is 62.5 $\mu$m within a range of error; that the outer radius $R_1$ of said first jacket layer is 125 $\mu$m within a range of error; that the outer radius $R_2$ of said second jacket layer is 200 $\mu$m within a range of error; that the Poisson's ratio of said soft curable resin is $v_1$ within a range of error; and that the deviation of the resin temperature of said UV curable resins from the temperature when the rigid UV curable resin starts hardening to the temperature when the hardening is finished is $\Delta T$, and wherein said soft curable resin is selected in order to have a coefficient of thermal expansion which is no higher than $(1-2v_1)/\Delta T$.

In accordance with a further aspect of the present invention, an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is much less than the Young's modulus of said rigid curable resin, wherein the radius $R_0$ of said fiber glass structure is 62.5 $\mu$m within a range of error; that the outer radius $R_1$ of said first jacket layer is 125 $\mu$m within a range of error; that the outer radius $R_2$ of said second jacket layer is 200 $\mu$m within a range of error; that the Poisson's ratio of said soft curable resin is $v_1$ within a range of error; and that the deviation of the resin temperature of said UV curable resins from the temperature when the rigid UV curable resin starts hardening to the temperature when the hardening is finished is $\Delta T$, and wherein said soft curable resin is selected in order to have a coefficient of thermal expansion satisfying $(1-2v_1)/180 > \alpha_1 > (1-2v_1)/225$.

In accordance with a further aspect of the present invention, an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is much less than the Young's modulus of said rigid curable resin, wherein the radius $R_0$ of said fiber glass structure is 62.5 $\mu$m within a range of error; that the outer radius $R_1$ of said first jacket layer is 125 $\mu$m within a range of error; that the outer radius $R_2$ of said second jacket layer is 200 $\mu$m within a range of error; that the Poisson's ratio of said soft curable resin is $v_1$ within a range of error; that the Poisson's ratio of said rigid curable resin is $v_2$ within a range of error; and that the deviation of the resin temperature of said UV curable resins from the temperature when the rigid UV curable resin starts hardening to the temperature when the hardening is finished is $\Delta T$, and wherein said soft curable resin is selected in order to have a coefficient of thermal expansion which is no higher than a $\alpha_0 = (1-2v_1)/\Delta_T$, and said rigid curable resin is selected in order to have a coefficient $\alpha_2$ of thermal expansion satisfying $15(\alpha_1-\alpha_0)/8(1+v_2) < \alpha_2 < 9(\alpha_1-\alpha_0)/4(1+v_2)$.

In accordance with a further aspect of the present invention, an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is much less than the Young's modulus of said rigid curable resin, wherein the radius $R_0$ of said fiber glass structure is 62.5 $\mu$m within a range of error; that the outer radius $R_1$ of said first jacket layer is 95 $\mu$m within a range of error; that the outer radius $R_2$ of said second jacket layer is 120 $\mu$m within a range of error; that the Poisson's ratio of said soft curable resin is $v_1$ within a range of error; and that the deviation of the resin temperature of said UV curable resins from the temperature when the rigid UV curable resin starts hardening to the temperature when the hardening is finished is $\Delta T$, and wherein said soft curable resin is selected in order to have a coefficient of thermal expansion which is no higher than $(1-2v_1)/\Delta T$.

In accordance with a further aspect of the present invention, an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is much less than the Young's modulus of said rigid curable resin, wherein the radius $R_0$ of said fiber glass structure is 62.5 μm within a range of error; that the outer radius $R_1$ of said first jacket layer is 95 μm within a range of error; that the outer radius $R_2$ of said second jacket layer is 120 μm within a range of error; that the Poisson's ratio of said soft curable resin is $v^1$ within a range of error; and that the deviation of the resin temperature of said UV curable resins from the temperature when the rigid UV curable resin starts hardening to the temperature when the hardening is finished is $\Delta T$, and wherein said soft curable resin is selected in order to have a coefficient of thermal expansion satisfying $(1-2v_1)/120 > \alpha_1 > (1-2v_1)/150$.

In accordance with a further aspect of the present invention, an optical fiber comprises: a fiber glass structure; a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is much less than the Young's modulus of said rigid curable resin, wherein the radius $R_0$ of said fiber glass structure is 62.5 μm within a range of error; that the outer radius $R_1$ of said first jacket layer is 95 μm within a range of error; that the outer radius $R_2$ of said second jacket layer is 120 μm within a range of error; that the Poisson's ratio of said soft curable resin is $v_1$ within a range of error; that the Poisson's ratio of said rigid curable resin is $v_2$ within a range of error; and that the deviation of the resin temperature of said UV curable resins from the temperature when the rigid UV curable resin starts hardening to the temperature when the hardening is finished is $\Delta T$, and wherein said soft curable resin is selected in order to have a coefficient of thermal expansion which is no higher than $\alpha_0 = (1-2v_1)/\Delta T$ and said rigid curable resin is selected in order to have a coefficient $\alpha_2$ of thermal expansion satisfying $\{0.8664/(1+v_2)\}(\alpha_1-\alpha_0) < \alpha_2 < \{1.03968/(1+v_2)\}(\alpha_1-\alpha_0)$.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 8 shows the result of a material strength test by means of a material strength test instrument with different types of soft UV curable resins and different environmental temperatures.

FIG. 9 shows the result of the observation for confirming whether or not there were formed voids or cracks (damages) after 6 types of optical fibers (1A to 1F) were prepared with different cure temperatures.

FIG. 10 shows the result of the observation for confirming whether or not there were formed voids or cracks (damages) after 6 types of optical fibers (A to E) were prepared with different cure temperatures.

DETAILED DESCRIPTION OF THE INVENTION

In the followings, various embodiments of the present invention will be described with reference to the accompanying drawings.

Figure 1:
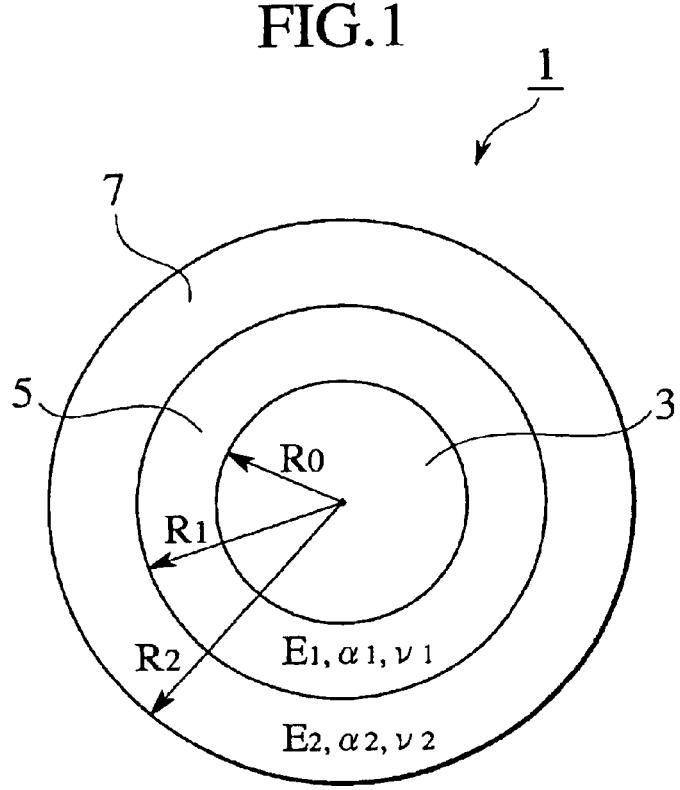
FIG. 1 is an explanatory view for explaining the mechanical factors of a fiber glass structure, the mechanical factors of a first jacket layer and the mechanical factors of a second jacket layer in accordance with an embodiment of the present invention.
Figure 2:
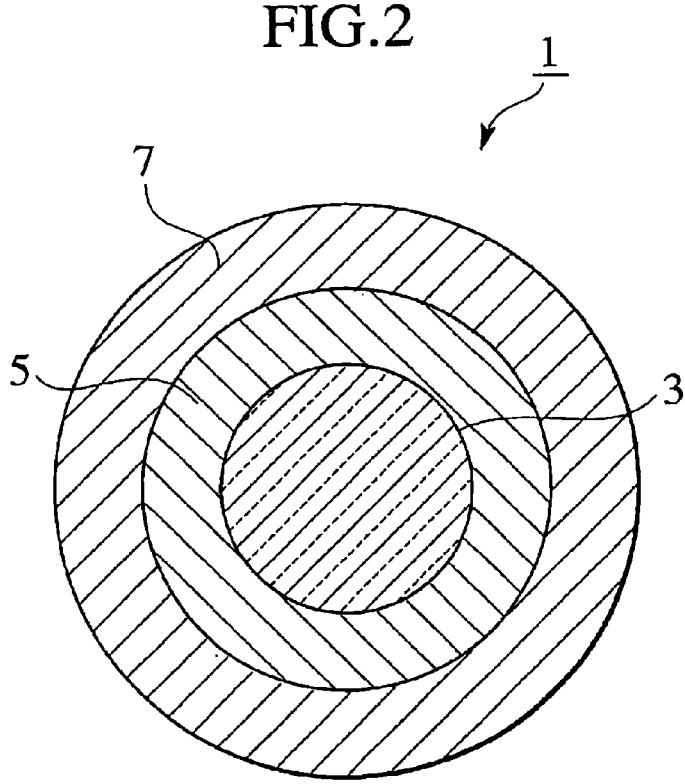
FIG. 2 is a cross sectional view showing fiber glass structure in accordance with the embodiment of the present invention.
Figure 4:
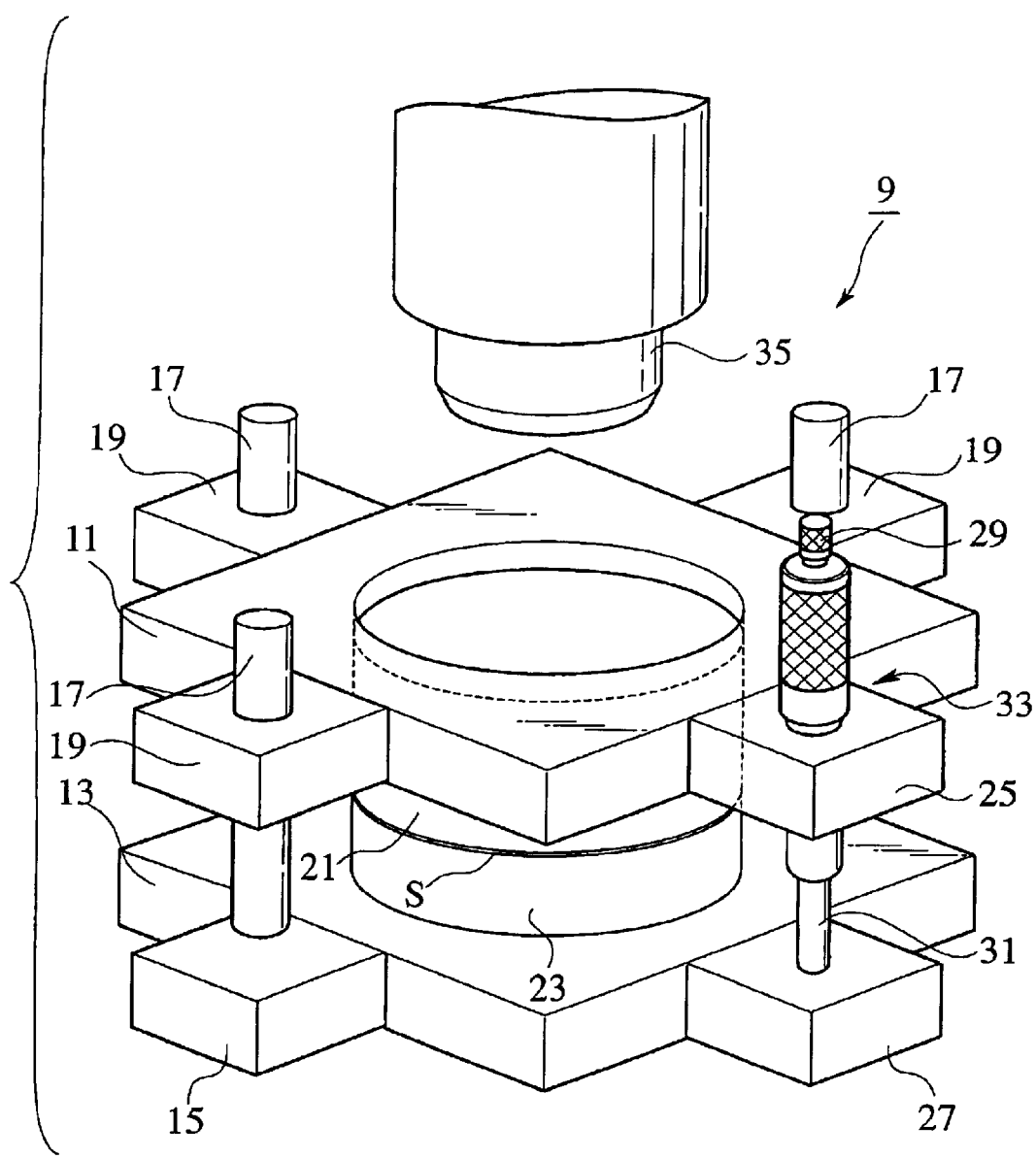
FIG. 4 is a schematic perspective view showing a material strength test instrument for use in explaining the embodiment of the present invention.
Figure 5A:
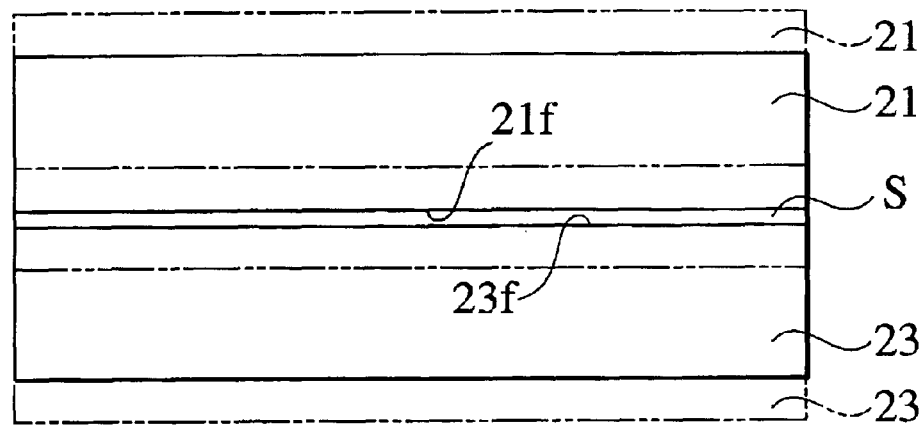
FIG. 5A to FIG. 5C are explanatory views for explaining a strength test of a test sheet by the use of the material strength test instrument for use in explaining the embodiment of the present invention.
Figure 5B:
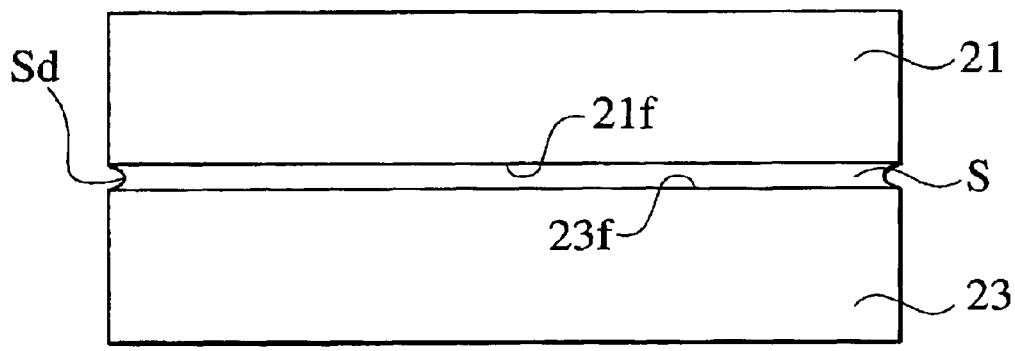
Figure 5C:
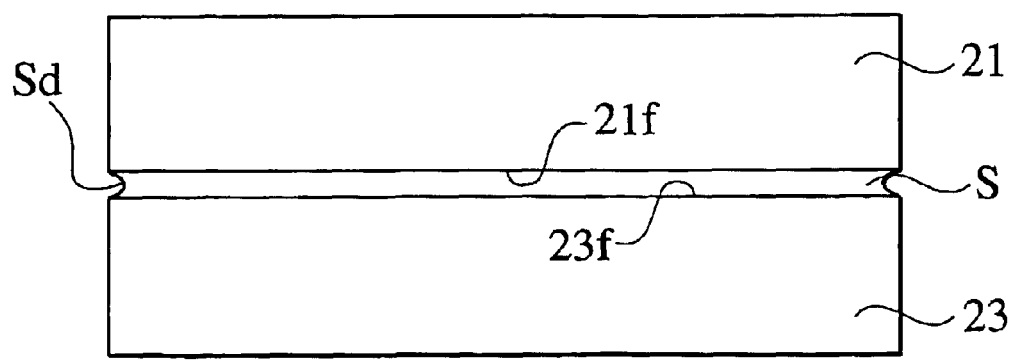
Figure 6:
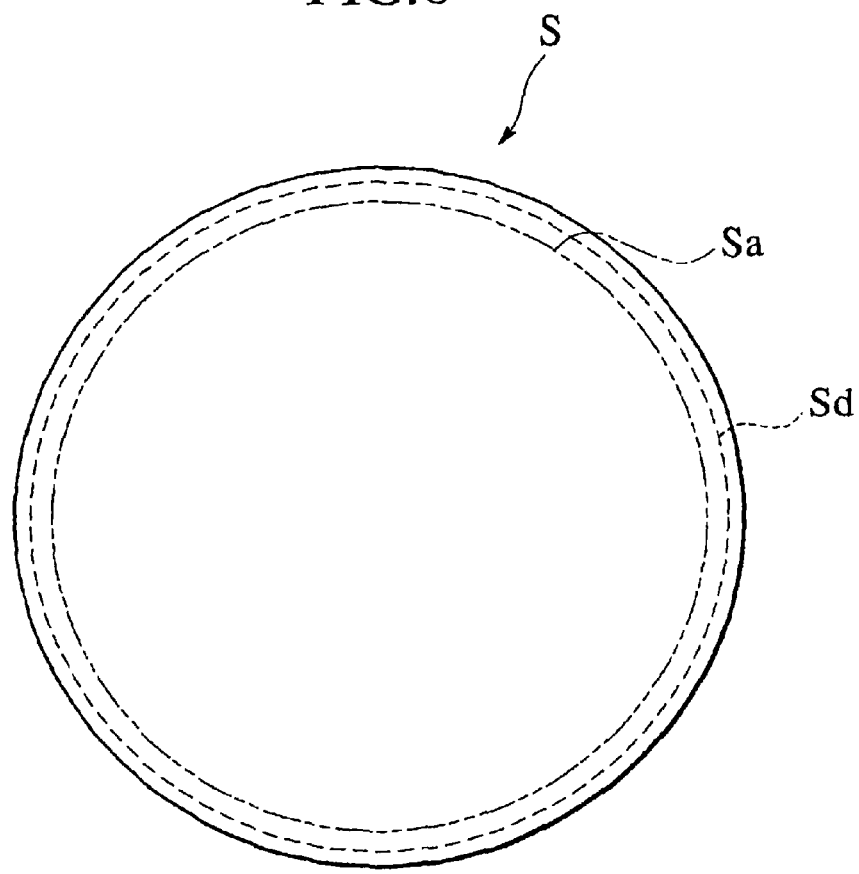
FIG. 6 is a schematic diagram showing the test sheet illustrated in FIG. 5A to FIG. 5C as viewed from above.

FIG. 1 is an explanatory view for explaining the mechanical factors of a fiber glass structure, the mechanical factors of a first jacket layer and the mechanical factors of a second jacket layer in accordance with an embodiment of the present invention. FIG. 2 is a cross sectional view showing fiber glass structure in accordance with an embodiment of the present invention. FIG. 4 is a schematic perspective view showing a material strength test instrument for use in explaining the embodiment of the present invention. FIG. 5A to FIG. 5C are an explanatory view for explaining a strength test of a test sheet by the use of the material strength test instrument for use in explaining the embodiment of the present invention. FIG. 6 is a schematic diagram showing the test sheet illustrated in FIG. 5A to FIG. 5C as viewed from above.

In this specification, the upper direction is the upper direction of the drawing sheet in the case of FIG. 4 and FIG. 5A to FIG. 5C while the upper direction is normal to the printing surface in the case of FIG. 6. Also, the lower direction is the lower direction of the drawing sheet in the case of FIG. 4 and FIG. 5A to FIG. 5C while the lower direction is normal to the rear surface in the case of FIG. 6.

As illustrated in FIG. 2, the optical fiber 1 in accordance with the embodiment of the present invention is composed of a fiber glass structure 3, a first jacket layer 5 directly covering the external surface of the fiber glass structure 3, and a second jacket layer 7 covering the external surface of the fiber glass structure 3 through the first jacket layer 5. In this case, the first jacket layer 5 is made of a soft UV curable resin while the second jacket layer 7 is made of a rigid UV curable resin.

Meanwhile, said soft curable resin and said rigid curable resin are prepared by blending UV curable resins and appropriate additives such as photo initiators in order to obtain required physical characteristics as described below.

Such UV curable resins includes UV curable prepolymers and UV curable monomers such as a UV curable epoxy acrylate resin, a UV curable urethane acrylate resin and other urethane based resins available for obtaining desired UV curable resin compositions.

Also, the optical fiber 1 is characterized by mechanical factors which can be measured by means of a material strength test instrument 9 as illustrated in FIG. 4. The material strength test by means of the material strength test instrument 9 will be explained as well as the respective components of the material strength test instrument 9.

As illustrated in FIG. 4, the material strength test instrument 9 in accordance with the embodiment of the present invention is provided with a first holder 11 in the form of a rectangle and a second holder 13 in the form of a rectangle as arranged opposed to each other in the vertical direction. The second holder 13 is provided with a plurality of fixed projections 15, each of which is provided with a guide pin 17 which is upwardly extending, while the first holder 11 is provided with a plurality of movable projections 19, each of which is supported by corresponding one of the guide pins 17 in order to move in the vertical direction. By this configuration, the first holder 11 is movably supported by the second holder 13 in the vertical direction.

The first holder 11 is provided at its center with a first fixed member 21 in the form of a cylinder having a first tractive surface 21f (refer to FIG. 5A to FIG. 5C) to which is tightly fixed the surface of an extremely thin test sheet S in the form of a disk under an adhesive force. Also, the second holder 13 is provided at its center with a second fixed member 23 in the form of a cylinder having a second tractive surface 23f (refer to FIG. 5A to FIG. 5C) to which is tightly fixed the rear surface of the test sheet S under an adhesive force. Furthermore, each of the first fixed member 21 and the second fixed member 23 is made of a transparent glass.

In this case, the test sheet S is made of the same soft UV curable resin as the first jacket layer 5 of the optical fiber 1 is. Also, the thickness of the test sheet S is equal to the thickness of the first jacket layer 5.

The first holder 11 is provided with an adjustment projection 25 while the second holder 13 is provided with a counter projection 27 located opposed to the adjustment projection 25. A micrometer head 33 is provided for finely displacing the first fixed member 21 in the upper direction (in other words in the thickness direction of the test sheet S away from the second fixed member 23). The micrometer head 33 is provided with a spindle 31 which is finely extended or contracted in accordance with the rotational operation of a finger grip 29. The distal end (lower end) of the spindle 31 can abuts against the counter projection.

Accordingly, it is possible to finely displace the first fixed member 21 integrally with the first holder 11 in the downward direction by letting the end of the spindle 31 abut against the counter projection 27 and rotating the finger grip 29 in order to slightly extend the spindle 31. At this time, the plurality of the movable projections 19 are supported and displaced in the upward direction with the plurality of the guide pins 17 and therefore the first tractive surface 21f and the second tractive surface 23f are maintained in parallel with each other.

The test sheet S can be observed through the first fixed member 21 by means of a microscope 35 which is provided above the first holder 11 and supported by a supporting arm not shown in the figure. Meanwhile, the location and the attitude of the microscope 35 can be adjusted by means of an appropriate mechanism.

Next, the material strength test by means of the material strength test instrument 9 will be explained.

As illustrated in FIG. 5A to FIG. 5C, the test sheet S is fixed with the primary surface thereof being tightly attached to the first tractive surface 21f of the first fixed member 21 under an adhesive force and with the rear surface thereof being tightly attached to the second tractive surface 23f of the second fixed member 23 under an adhesive force (refer to FIG. 5A). By this configuration, it is possible to hold a stress effective area of the test sheet S, which is the entirety of the test sheet S except for the peripheral portion, preventing the stress effective area from being displaced in the radial direction and in the peripheral direction.

While there is formed a recess Sd curved inwardly from the external peripheral surface of the test sheet S when the first fixed member 21 is finely displaced in the upper direction, the stress effective area in accordance with the embodiment of the present invention is defined as the entirety of the test sheet S except for the portion near its perimeter and as an area where such a recess Sd is not formed (refer to FIG. 6).

Then, while monitoring the test sheet S in an expanded view by means of the microscope 35 through the first fixed member 21, the first fixed member 21 is finely displaced in the upper direction (refer to FIG. 5B) by letting the end of the spindle 31 abut against the counter projection 27 and rotating the finger grip 29 in order to slightly extend the spindle 31 with the first tractive surface 21f and the second tractive surface 23f being maintained in parallel with each other. In this case, the test sheet S tends to horizontally contract. Since the horizontal contraction of the test sheet S within the stress effective area is restricted between the first tractive surface 21f and the second tractive surface 23f, it is possible to apply a tensile stress in the radial direction and a tensile stress in the peripheral direction, as well as a tensile stress in the thickness direction (the vertical direction in FIG. 5A to FIG. 5C) to the stress effective area of the test sheet S. In other words, it is possible to apply a three-dimensional tensile stress to the stress effective area of the test sheet S. Also, while the test sheet S is extremely thin, the tensile stress applied to the stress effective area of the test sheet S becomes substantially uniform in the three-dimensional direction.

In this specification, the three-dimensional tensile stress includes the tensile stress $\sigma_{0_R}$ in said radial direction, the tensile stress $\sigma_{0_\theta}$ in said peripheral direction and the tensile stress $\sigma_{0_z}$ in said thickness direction.

When the fine displacement of the first fixed member 21 increases to increase the three-dimensional tensile stress applied to the stress effective area of the test sheet S as illustrated in FIG. 5C, there are formed voids V or cracks (not shown in the figure). Then, the destructive stress of said soft UV curable resin under the three-dimensional tensile stress can be measured on the basis of the displacement of the first fixed member 21 when there are formed voids V or cracks in the test sheet S.

In this case, the three-dimensional tensile stress relating to the displacement of the first fixed member 21 can be calculated for example by analysis on the basis of the finite element method, and there is a linear dependency between the three-dimensional tensile stress and the displacement of the first fixed member 21 within the stress effective area of the test sheet S. Also, the destructive stress of said soft UV curable resin under the three-dimensional tensile stress is defined as the average tensile stress $(\sigma_{0_r}+\sigma_{0_\theta}+\sigma_{0_z})/3$ of the three-dimensional tensile stress as applied to the test sheet S when there are formed voids V or cracks in the test sheet S.

FIG. 8 shows the result of the material strength test by means of the material strength test instrument 9 with different types of soft UV curable resins and different environmental temperatures. The radius of the first fixed member 21 and the diameter of the second fixed member 23 were 50 mm respectively. The test sheet S had a radius of 50 mm and a thickness of 100 μm.

In the experiment, the tensile stress ($\sigma_{0r}$, $\sigma_{0\theta}$ and $\sigma_{0z}$) applied to the stress effective area of the test sheet S was gradually increased substantially uniformly in the three-dimensional direction by letting the end of the spindle 31 abut against the counter projection 27 and rotating the finger grip 29 until there were formed voids V or cracks in the test sheet S. As illustrated in FIG. 8, in each case of the experiments, the average tensile stress ($\sigma_{0r}+\sigma_{0\theta}+\sigma_{0z}$)/3 of the three-dimensional tensile stress as applied to the test sheet S when there are formed voids V or cracks in the test sheet S, i.e., the destructive stress was larger than the Young's modulus of said soft UV curable resin.

Next, a selection method for selecting the mechanical factors and the coefficient of thermal expansion of the optical fiber 1 will be explained on the basis of the result of the material strength test by means of the material strength test instrument 9.

As illustrated in FIG. 1, while the resin temperature of UV curable resins largely falls from the temperature when the rigid UV curable resin starts hardening to the temperature when the hardening is finished, the average tensile stress ($\sigma_r+\sigma_\theta+\sigma_z$)/3 is applied to the first jacket layer 5.

The mechanical factor of the fiber glass structure 3, the mechanical factors of the first jacket layer 5 and the mechanical factors of the second jacket layer 7 are selected in order to meet the requirement that the average tensile stress ($\sigma_r+\sigma_\theta+\sigma_z$)/3 of the three-dimensional tensile stress as applied to the first jacket layer 5 is always no larger than Young's modulus $E_1$ of the first jacket layer 5.

In this case, $\sigma_r$ stands for the tensile stress in the radial direction of the first jacket layer 5; $\sigma_\theta$ stands for the tensile stress in the peripheral direction of the first jacket layer 5; and $\sigma_z$ stands for the tensile stress in the axial direction of the first jacket layer 5. More specifically speaking, the mechanical factor of the fiber glass structure 3 is the radius $R_0$ of the fiber glass structure 3; the mechanical factors of the first jacket layer 5 are the outer radius $R_1$ of the first jacket layer 5, Young's modulus $E_1$ of said soft UV curable resin, the coefficient $\alpha_1$ of thermal expansion and the Poisson's ratio $v_1$; and the mechanical factors of the second jacket layer 7 are the outer radius $R_2$ of the second jacket layer 7, Young's modulus $E_2$ of said rigid UV curable resin, the coefficient $\alpha_2$ of thermal expansion and the Poisson's ratio $v_2$. The above requirement has to be satisfied not only when the hardening is finished but also thereafter while the environmental temperature may be changed.

$\sigma_r$, $\sigma_\theta$ and $\sigma_z$ can be calculated as follow taking into consideration the characteristics of said soft UV curable resin and the characteristics of said rigid UV curable resin.

$$\sigma_r = \sigma_\theta = \frac{\left\{1 - \frac{E_1}{E_2} \times \frac{R_0^2}{R_1^2 - R_0^2} \times \frac{(1-2v_2)R_1^2 + R_2^2}{R_2^2 - R_1^2}\right\}\alpha_1 - \left(\frac{R_1^2}{R_1^2 - R_0^2}\right)\alpha_2}{(1-2v_1) - \frac{E_1}{E_2} \times \frac{(1-2v_1)R_0^2 + R_1^2}{R_1^2 - R_0^2} \times \frac{(1-2v_2)R_1^2 + R_2^2}{R_2^2 - R_1^2}} \times E_1 \Delta T$$

Equation (1)

$$\sigma_z = \frac{\left\{1 - \frac{E_1}{E_2} \times \frac{R_0^2 + R_1^2}{R_1^2 - R_0^2} \times \frac{(1-2v_2)R_1^2 + R_2^2}{R_2^2 - R_1^2}\right\}\alpha_1 - \left(\frac{2v_1 R_1^2}{R_1^2 - R_0^2}\right)\alpha_2}{(1-2v_1) - \frac{E_1}{E_2} \times \frac{(1-2v_1)R_0^2 + R_1^2}{R_1^2 - R_0^2} \times \frac{(1-2v_2)R_1^2 + R_2^2}{R_2^2 - R_1^2}} \times E_1 \Delta T$$

Equation (2)

In the above equations, $\Delta T$ is the deviation of the resin temperature (as falling) of said soft UV curable resin. The average tensile stress ($\sigma_r+\sigma_\theta+\sigma_z$)/3 of the three-dimensional tensile stress can be calculated as follow.

$$\frac{\sigma_r + \sigma_\theta + \sigma_z}{3} = \frac{\left\{1 - \frac{E_1}{E_2} \times \frac{3R_0^2 + R_1^2}{3(R_1^2 - R_0^2)} \times \frac{(1-2v_2)R_1^2 + R_2^2}{R_2^2 - R_1^2}\right\}\alpha_1 - \left\{\frac{2(1+v_2)}{3} \times \frac{R_1^2}{R_1^2 - R_0^2}\right\}\alpha_2}{(1-2v_1) - \frac{E_1}{E_2} \times \frac{(1-2v_1)R_0^2 + R_1^2}{R_1^2 - R_0^2} \times \frac{(1-2v_2)R_1^2 + R_2^2}{R_2^2 - R_1^2}} \times E_1 \Delta T$$

Equation (3)

Namely, $$\frac{\left\{1 - \frac{E_1}{E_2} \times \frac{3R_0^2 + R_1^2}{3(R_1^2 - R_0^2)} \times \frac{(1-2v_2)R_1^2 + R_2^2}{R_2^2 - R_1^2}\right\}\alpha_1 - \left\{\frac{2(1+v_2)}{3} \times \frac{R_1^2}{R_1^2 - R_0^2}\right\}\alpha_2}{(1-2v_1) - \frac{E_1}{E_2} \times \frac{(1-2v_1)R_0^2 + R_1^2}{R_1^2 - R_0^2} \times \frac{(1-2v_2)R_1^2 + R_2^2}{R_2^2 - R_1^2}} \times$$

Equation (4)

$$E_1 \Delta T < E_2$$

The mechanical factor of the fiber glass structure 3, the mechanical factors of the first jacket layer 5 and the mechanical factors of the second jacket layer 7 have to be selected in order to satisfy the equation (4). Next, the outstanding features of the present invention will be explained.

There no longer occur voids V or cracks in the first jacket layer 5 due to the three-dimensional tensile stress ($\sigma_r$, $\sigma_\theta$, $\sigma_z$) when the hardening is finished, because the mechanical factor of the fiber glass structure 3, the mechanical factors of the first jacket layer 5 and the mechanical factors of the second jacket layer 7 are selected in order to meet the requirement that the average tensile stress $(\sigma_r+\sigma_\theta+\sigma_z)/3$ of the three-dimensional tensile stress as applied to the first jacket layer 5 is always no larger than Young's modulus $E_1$ of the first jacket layer 5.

This is based upon the experimental result (refer to FIG. 8) that when the tensile stress ($\sigma_{0r}$, $\sigma_{0\theta}$ and $\sigma_{0z}$) applied to the stress effective area of the test sheet S was gradually increased substantially uniformly in the three-dimensional direction until there were formed voids V or cracks in the test sheet S, the average tensile stress $(\sigma_{0r}+\sigma_{0\theta}+\sigma_{0z})/3$ of the three-dimensional tensile stress as applied to the test sheet S, i.e., the destructive stress was larger than the Young's modulus of said soft UV curable resin.

As explained in the above, in accordance with the embodiment of the present invention, since there no longer occur voids V or cracks in the first jacket layer 5 due to the three-dimensional tensile stress ($\sigma_r$, $\sigma_\theta$, $\sigma_z$) when the hardening is finished, it is possible to improve the quality of the optical fiber 1 by stabilizing the supporting condition of the fiber glass structure 3 by the first jacket layer 5 in order to minimize the transmission loss of the optical fiber 1 due to slight bending of the fiber glass structure.

Needless to say, there are same advantages also in the case of an optical fiber cable (not shown) composed of the optical fiber 1 as described above. In this case, such optical fiber cables include optical fiber ribbons and optical fiber codes as well as an narrow definition of optical fiber cables, Meanwhile, in the above described embodiment, the jacket layers 5 and 7 are formed of rigid UV curable resins. However, the jacket layers 5 and 7 can be formed of other types of curable resins.

In the following explanation, a more specific experimental example will be explained.

The experiment has been conducted in the conditions that the radius $R_0$ of the fiber glass structure 3 was 62.5 μm; that the outer radius $R_1$ of the first jacket layer 5 was 125 μm; that the outer radius $R_2$ of the second jacket layer 7 was 200 μm; that the Young's modulus $E_1$ of the first jacket layer 5 is 2.5 MPa at an environmental temperature of −20° C., 1.1 MPa at an environmental temperature of 0° C., and 1.0 MPa at an environmental temperature of 20° C., the Young's modulus $E_1$ of the second jacket layer 7 is 1300 MPa at an environmental temperature of −20° C., 1000 MPa at an environmental temperature of 0° C., and 700 MPa at an environmental temperature of 20° C.; and that 6 types of optical fibers (1A to 1F) were prepared with different resin temperatures (cure temperatures) from 100° C. to 200° C. In the conditions, the 6 optical fibers (1A to 1F) were observed in order to confirm whether or not there were formed voids or cracks (damages). FIG. 9 shows the result of the observation.

As apparent from FIG. 9, it is confirmed that if the average tensile stress $(\sigma_r+\sigma_\theta+\sigma_z)/3$ of the three-dimensional tensile stress as applied to the first jacket layer 5 is larger than Young's modulus $E_1$ of the first jacket layer 5 there occur voids V or cracks in the first jacket layer 5, and that if the average tensile stress $(\sigma_r+\sigma_\theta+\sigma_z)/3$ of the three-dimensional tensile stress as applied to the first jacket layer 5 is no larger than Young's modulus $E_1$ of the first jacket layer 5 there no longer occur voids V or cracks in the first jacket layer 5.

Next, another embodiment of the present invention will be explained. The average tensile stress $(\sigma_r+\sigma_\theta+\sigma_z)/3$ of the three-dimensional tensile stress applied to the first jacket layer should satisfy the Equation (3) and Equation (4) wherein ΔT is the deviation of the resin temperature (as falling) of said soft UV curable resin. The mechanical factor of the fiber glass structure 3, the mechanical factors of the first jacket layer 5 and the mechanical factors of the second jacket layer 7 have to be selected in order to satisfy the equation (4).

It is furthermore assumed here that Young's modulus $E_1$ of said soft UV curable resin is extremely small as compared to Young's modulus $E_2$ of said rigid UV curable resin. By this assumption, the following equations are obtained.

$$\frac{E_1}{E_2} \times \frac{3R_0^2 + R_1^2}{3(R_1^2 - R_0^2)} \times \frac{(1-2v_2)R_1^2 + R_2^2}{R_2^2 - R_1^2} \ll 1 \quad \text{Equation (5)}$$

$$\frac{E_1}{E_2} \times \frac{(1-2v_1)R_0^2 + R_1^2}{R_1^2 - R_0^2} \times \frac{(1-2v_2)R_1^2 + R_2^2}{R_2^2 - R_1^2} \ll (1-2v_1) \quad \text{Equation (6)}$$

The equation (4) can be simplified from the equation (5) and the equation (6) as follows.

$$\frac{\sigma_r + \sigma_\theta + \sigma_z}{3} = \frac{\alpha_1 - \frac{2}{3}(1+v_2) \times \frac{R_1^2}{R_1^2 - R_0^2}\alpha_2}{1 - 2v_1} \times E_1 \Delta T \quad \text{Equation (7)}$$

The equation (7) can be rearranged with the equation that $(\sigma_r+\sigma_\theta+\sigma_z)/3 < E_1$ as follows.

$$\alpha_2 > \frac{3}{2(1+v_2)}\left\{1 - \left(\frac{R_0}{R_1}\right)^2\right\}\left\{\alpha_1 - \frac{1-2v_1}{\Delta T}\right\} \quad \text{Equation (8)}$$

In this case, predetermined are the radius $R_0$ of the fiber glass structure 3, the outer radius $R_1$ of the first jacket layer 5, the Poisson's ratio $v_1$ of the soft UV curable resin, the outer radius $R_2$ of the second jacket layer 7, the Poisson's ratio $v_2$ of the rigid UV curable resin, and the deviation ΔT of the resin temperature of said UV curable resins from the temperature when the rigid UV curable resin starts hardening to the temperature when the hardening is finished.

Then, said soft UV curable resin and said rigid UV curable resin are selected in order to the coefficient of thermal expansion $\alpha_1$ of said soft UV curable resin and the coefficient of thermal expansion $\alpha_2$ of said rigid UV curable resin satisfy the relational expression of the Equation (8).

Next, the outstanding features of the present invention will be explained.

Since said soft UV curable resin and said rigid UV curable resin are selected in order that the coefficient of thermal expansion $\alpha_1$ of said soft UV curable resin and the coefficient of thermal expansion $\alpha_2$ of said rigid UV curable resin satisfy the relational expression of the Equation (8), the average tensile stress $(\sigma_r+\sigma_\theta+\sigma_z)/3$ of the three-dimensional tensile stress as applied to the first jacket layer 5 is always no larger than Young's modulus $E_1$ of the first jacket layer 5 even when the resin temperature of UV curable resins largely falls from the temperature when the rigid UV curable resin starts hardening to the temperature when the hardening is finished, and therefore there no longer occur voids V or cracks in the first jacket layer 5 due to said three-dimensional tensile stress when the hardening is finished.

This is because of the following two points.

Namely, the first point is the result of the material strength test (refer to FIG. 8) that when the tensile stress ($\sigma_r$, $\sigma_{0\theta}$ and $\sigma_{0z}$) applied to the stress effective area of the test sheet S was gradually increased substantially uniformly in the three-dimensional direction until there were formed voids V or cracks in the test sheet S, the average tensile stress $(\sigma_{0r}+\sigma_{0\theta}+\sigma_{0z})/3$ of the three-dimensional tensile stress as applied to the test sheet S, i.e., the destructive stress was larger than the Young's modulus of said soft UV curable resin.

The second point is that the relational expression (Equation (4)) is derived on the basis of the material mechanics from the requirement that the average tensile stress $(\sigma_r+\sigma_\theta+\sigma_z)/3$ of the three-dimensional tensile stress is no larger than Young's modulus $E_1$ of the first jacket layer 5 with reference to the result of the material strength test, and simplified to the relational expression (Equation (8)) of the coefficients of thermal expansion on the basis of the assumption that Young's modulus $E_1$ of said soft UV curable resin is extremely small as compared to Young's modulus $E_2$ of said rigid UV curable resin.

As explained in the above, in accordance with the embodiment of the present invention, since there no longer occur voids V or cracks in the first jacket layer 5 due to the three-dimensional tensile stress $(\sigma_r, \sigma_\theta, \sigma_z)$ when the hardening is finished, it is possible to improve the quality of the optical fiber 1 by stabilizing the supporting condition of the fiber glass structure 3 by the first jacket layer 5 in order to minimize the transmission loss of the optical fiber 1 due to slight bending of the fiber glass structure.

Also, since the relational expression of (Equation (4)) of said material mechanics is simplified into the relational expression of said coefficients of thermal expansion (Equation (8)), it is easy to make appropriate selection of said soft UV curable resin and said rigid UV curable resin in order not to cause voids and cracks in the first jacket layer 5.

Furthermore, there are same advantages also in the case of an optical fiber cable (not shown) composed of a plurality of optical fibers each of which is fabricated in the same manner as the optical fiber 1 as described above. In this case, such an optical fiber cables may be a single optical fiber, an optical fiber ribbon, an optical fiber cord as well as a fiber structure in accordance with an narrow definition of optical fiber cables in which a number of optical fibers or core wires are bundled.

Meanwhile, in the above described embodiment, the jacket layers 5 and 7 are formed of rigid UV curable resins. However, the jacket layers 5 and 7 can be formed of other types of curable resins.

In the following explanation, a more specific experimental example will be explained.

Figure 3:
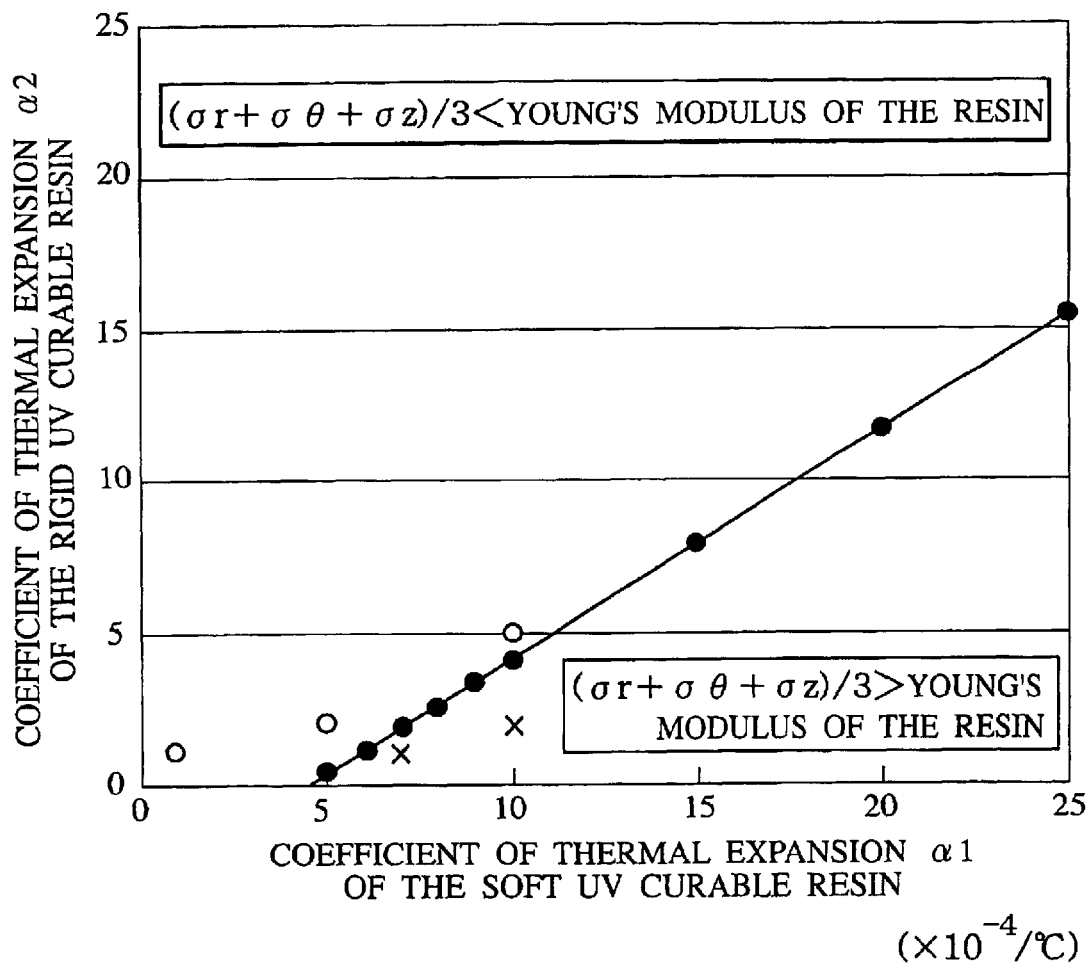
FIG. 3 is a graphic diagram showing the relation of the coefficients of thermal expansion of soft UV curable resins and rigid UV curable resins.

FIG. 3 is a graphic diagram showing the relation of the coefficients of thermal expansion or said soft UV curable resin and said rigid UV curable resin.

The graphic diagram as illustrated in FIG. 3 has been plotted in accordance with Equation (8) in the case where the radius $R_0$ of the fiber glass structure 3 was 62.5 $\mu$m; that the outer radius $R_1$ of the first jacket layer 5 was 125 $\mu$m; that the outer radius $R_2$ of the second jacket layer 7 was 200 $\mu$m; the Poisson's ratio $v_1$ of said soft UV curable resin and the Poisson's ratio $v_2$ of said rigid UV curable resin are 0.46 respectively; and the deviation $\Delta T$ of the resin temperature of said UV curable resins from the temperature when the rigid UV curable resin starts hardening to the temperature when the hardening is finished.

Namely, the declined line as illustrated in FIG. 3 separates the space defined by the coefficient of thermal expansion $\alpha_1$ of said soft UV curable resin and the coefficient of thermal expansion $\alpha_2$ of said rigid UV curable resin into an upper left region and a lower right region. In the upper left region, the average tensile stress $(\sigma_r+\sigma_\theta+\sigma_z)/3$ of the three-dimensional tensile stress is no larger than Young's modulus $E_1$ of the first jacket layer 5 so that there no longer occur voids V or cracks in the first jacket layer 5. On the other hand, in the lower right region, the average tensile stress $(\sigma_r+\sigma_\theta+\sigma_z)/3$ of the three-dimensional tensile stress is larger than Young's modulus $E_1$ of the first jacket layer 5 so that there occur voids V or cracks in the first jacket layer 5.

An experiment was conducted in the conditions that the radius $R_0$ of the fiber glass structure 3 was 62.5 $\mu$m; that the outer radius $R_1$ of the first jacket layer 5 was 125 $\mu$m; that the outer radius $R_2$ of the second jacket layer 7 was 200 $\mu$m; the Poisson's ratio $v_1$ of said soft UV curable resin and the Poisson's ratio $v_2$ of said rigid UV curable resin are 0.46 respectively; and the deviation $\Delta T$ of the resin temperature of said UV curable resins from the temperature when the rigid UV curable resin starts hardening to the temperature when the hardening is finished.; and that 5 types of optical fibers (A to E) were prepared with different pairs of said soft UV curable resins and said rigid UV curable resins with different combinations of the coefficients of thermal expansion $\alpha_1$ and $\alpha_2$. In the conditions, the 5 optical fibers (A to E) were observed in order to confirm whether or not there were formed voids or cracks (damages). FIG. 10 shows the result of the observation.

As apparent from FIG. 10, in the case of the optical fibers A, B and C, the coefficients of thermal expansion of the two rigid UV curable resins (the coefficient of thermal expansion $\alpha_1$ of said soft UV curable resin and the coefficient of thermal expansion $\alpha_2$ of said rigid UV curable resin) is located in the upper left region as defined by the declined line so that it is confirmed that there have no longer occurred voids V or cracks in the first jacket layer 5. On the other hand, in the case of the optical fibers D and E, the coefficients of thermal expansion of the two rigid UV curable resins is located in the upper left region as defined by the declined line so that it is confirmed that there have observed voids V or cracks in the first jacket layer 5.

Figure 7:
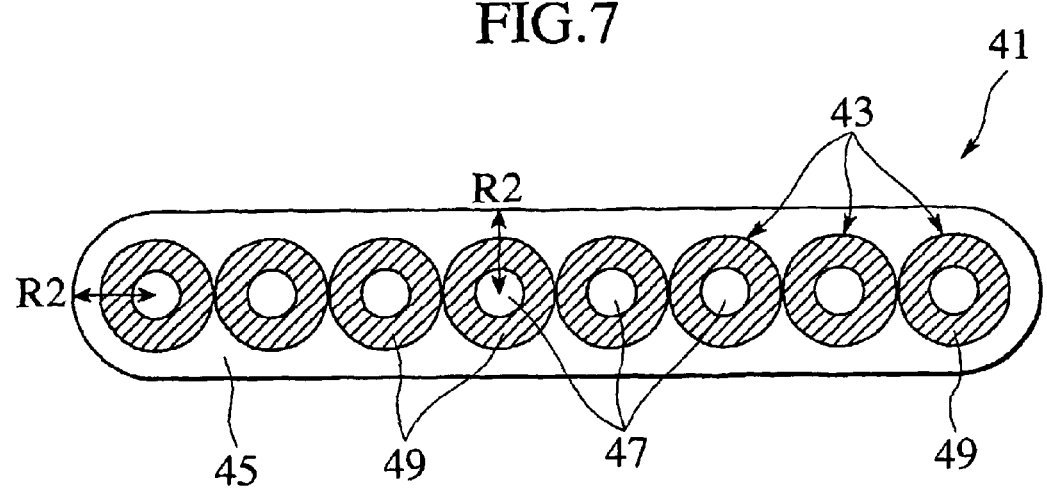
FIG. 7 is a cross sectional view showing the optical fiber ribbon (8-fiber ribbon) in accordance with the embodiment of the present invention.

Next, and optical fiber ribbon in accordance with an embodiment of the present invention will be explained. FIG. 7 is a cross sectional view showing the optical fiber ribbon (8-fiber ribbon) in accordance with the embodiment of the present invention.

As illustrated in FIG. 7, the optical fiber ribbon 41 in accordance with the present invention is composed of a plurality of individual optical fiber cores 43, which are arranged in parallel, covered with a second jacket layer made of a resin ribbon material (a UV curable resin) around the individual optical fiber cores and united together in the form of a tape.

The number of the individual optical fiber cores 43 is selected to be an arbitrary number more than one.

The type of the individual optical fiber cores 43 can also be arbitrarily selected as long as the physical characteristics satisfy the requirements as described above. For example, each individual optical fiber core 43 may be formed of a bare optical fiber 47 having an external diameter of 125 $\mu$m which is covered with a UV curable resin coating 49 as a first jacket layer, whose external diameter is 250 to 400 $\mu$m for example.

In this case, the outer radius $R_2$ of the second jacket layer 45 composed of a rigid UV curable resin is defined as the distance between the center point of the bare optical fiber 47 and the point which is closest to the bare optical fiber 47 among points located on the outer surface of the second jacket layer 45. In this case, the above discussion is substantially applied to the optical fiber ribbon 41. Accordingly, the technique of selecting said soft UV curable resin and said rigid UV curable resin as described above is effective also for optical fiber ribbons.

In the following description, several practical exemplary implementations will be explained. In this case, it is assumed that the radius $R_0$ of the fiber glass structure 3 is 62.5 μm; that the outer radius $R_1$ of the first jacket layer 5 is 125 μm; that the outer radius $R_2$ of the second jacket layer 7 is 200 μm; and that the Poisson's ratio $v_2$ of said rigid UV curable resin is 0.45 to 0.49. Also, it is assumed that the radius $R_0$ of the fiber glass structure, the outer radius $R_1$ of the first jacket layer 5 and the outer radius $R_2$ of the second jacket layer 7 are accurate within ±0.3 μm respectively.

In this case, the x-intercept ($\alpha_0$) of the declined line as illustrated in FIG. 3 is determined by the Poisson's ratio $v_1$ and the deviation ΔT of the resin temperature of said UV curable resins from the temperature when the rigid UV curable resin starts hardening to the temperature when the hardening is finished, as $\alpha_0=(1-2v_1)/\Delta T$. Accordingly, the x-intercept ($\alpha_0$) can be handled in place of the Poisson's ratio $v_1$ and the deviation ΔT of the resin temperature. In the case where the Poisson's ratio $v_1$ is 0.42 to 0.47 and the deviation ΔT of the resin temperature of said UV curable resins from the temperature when the rigid UV curable resin starts hardening to the temperature when the hardening is finished is no higher than 180° C., the x-intercept ($\alpha_0$) is about 8.9 to 3.3. On the other hand, the slope of the declined line as illustrated in FIG. 3 is $R'/(1+v_2)$ where $R'=(3/2)\{1+(R_0/R_1)^2\}$. Namely, the slope of the declined line is $(8/15)/(1+v_2)$.

In this situation, the coefficient of thermal expansion is selected as follows. First, a soft UV curable resin is selected in order that the coefficient of thermal expansion $\alpha_1$ thereof is no higher than $\alpha_0$. Namely, the coefficient of thermal expansion $\alpha_1$ is selected to be no higher than $(1-2v_1)/\Delta T$. Accordingly, a soft UV curable resin is selected in order that the coefficient of thermal expansion $\alpha_1$ thereof is no higher than a value about from 8.9 to 3.3 corresponding to the Poisson's ratio $v_1$ from 0.42 to 0.47. However, in the case where a soft UV curable resin can not be selected in order that the coefficient of thermal expansion a, thereof is no higher than $\alpha_0$, a rigid UV curable resin should be selected in order that the coefficient of thermal expansion $\alpha_2$ thereof is no lower than $R'(\alpha_1-\alpha_0)/(1+v_2)$ i e., $15(\alpha_1-\alpha_0)/8(1+v_2)$.

In accordance with the present invention, it is possible to expand the range of choices for the coefficient of thermal expansion. This is a substantial advantage in designing the process. Namely, it is possible to guarantee the reliability of an optical fiber irrespective of the coefficient of thermal expansion $\alpha_2$ of the soft UV curable resin by selecting the soft UV curable resin having a coefficient of thermal expansion $\alpha_1$ no higher than $(1-2v_1)/\Delta T$. Also, since there are determined the safe ranges of the coefficient of thermal expansion $\alpha_1$ of the soft UV curable resin and the coefficient of thermal expansion $\alpha_2$ of the rigid UV curable resin, it is possible to make selection of combinations of soft UV curable resins and rigid UV curable resins which have not been made prior to the present invention.

Accordingly, the present invention is particularly characteristic when the coefficient of thermal expansion $\alpha_1$ of the soft UV curable resin is selected near $\alpha_0$, for example, from $\alpha_0$: to 80% thereof. Namely, the coefficient of thermal expansion $\alpha_1$ should satisfy $$(1-2v_1)/180 > \alpha_1 > (1-2v_1)/225.$$

In usual cases, the range of the coefficient of thermal expansion $\alpha_1$ of the soft UV curable resin near $\alpha_0$ is not reliable. However, in accordance with the present invention, the reliability is guaranteed as described above. However, in the case where a soft UV curable resin can not be selected in order that the coefficient of thermal expansion $\alpha_1$ thereof is no higher than $\alpha_0$, a rigid UV curable resin is selected in order that the coefficient of thermal expansion $\alpha_2$ thereof is no lower than $R'(\alpha_1-\alpha_0)/(1+v_2)$ and no higher than 120% thereof, i.e., satisfying $$R'(\alpha_1-\alpha_0)/(1+v_2) < \alpha_2 < (6/5)\{R'(\alpha_1-\alpha_0)/(1+v_2)\}.$$

In this case, $$15(\alpha_1-\alpha_0)/8(1+v_2) < \alpha_2 < 9(\alpha_1-\alpha_0)/4(1+v_2)$$

should be satisfied. This range of $\alpha_2$ is also considered to be not reliable in usual cases. However, in accordance with the present invention, the reliability is guaranteed as described above.

For example, in the case of the exemplary implementation as described above, $\alpha_0$ is about $8.9 \times 10^{-4}$ when the Poisson's ratio $v_1$ of said soft UV curable resin is 0.42 within a range of error. In this case, it is possible to make selection of combinations of soft UV curable resins and rigid UV curable resins which have not been realized prior to the present invention by selecting a soft UV curable resin to have a coefficient of thermal expansion of, from $8.9 \times 10^{-4}$ to $7.1 \times 10^{-4}$.

Next, another exemplary implementation of the present invention will be explained. In this case, it is assumed that the radius $R_0$ of the fiber glass structure 3 is 62.5 μm; that the outer radius $R_1$ of the first jacket layer 5 is 95 μm; that the outer radius $R_2$ of the second jacket layer 7 is 120 μm; and that the Poisson's ratio $v_2$ of said rigid UV curable resin is 0.45 to 0.49. Also, it is assumed that the radius $R_0$ of the fiber glass structure, the outer radius $R_1$ of the first jacket layer 5 and the outer radius $R_2$ of the second jacket layer 7 are accurate within ±0.3 μm respectively.

Also, in this case, the x-intercept ($\alpha_0$) of the declined line as illustrated in FIG. 3 is determined by the Poisson's ratio $v_1$ and the deviation ΔT of the resin temperature of said UV curable resins from the temperature when the rigid UV curable resin starts hardening to the temperature when the hardening is finished, as $\alpha_0=(1-2v_1)/\Delta T$. The x-intercept ($\alpha_0$) can be handled in place of the Poisson's ratio $v_1$ and the deviation ΔT of the resin temperature. In the case where the Poisson's ratio $v_1$ is 0.42 to 0.47 and the deviation ΔT of the resin temperature of said UV curable resins from the temperature when the rigid UV curable resin starts hardening to the temperature when the hardening is finished is no higher than 120° C., the x-intercept ($\alpha_0$) is about 3.0 to 2.2. On the other hand, the slope of the declined line as illustrated in FIG. 3 is $R'/(1+v_2)$ where $R'=(3/2)\{1+(R_0/R_1)^2\}$. Namely, the slope of the declined line is $0.8664/(1+v_2)$.

In this situation, the coefficient of thermal expansion is selected as follows. First, a soft UV curable resin is selected in order that the coefficient of thermal expansion $\alpha_1$ thereof is no higher than $\alpha_0$. Namely, the coefficient of thermal expansion $\alpha_1$ is selected to be no higher than $(1-2v_1)/\Delta T$. Accordingly, a soft UV curable resin is selected in order that the coefficient of thermal expansion $\alpha_1$ thereof is no higher than a value about from 8.9 to 3.3 corresponding to the Poisson's ratio $v_1$ from 3.0 to 2.2. However, in the case where a soft UV curable resin can not be selected in order that the coefficient of thermal expansion a, thereof is no higher than $\alpha_0$, a rigid UV curable resin should be selected in order that the coefficient of thermal expansion $\alpha_2$ thereof is no lower than $R'(\alpha_1-\alpha_0)/(1+v_2)$, i.e., $\{0.8664/(1+v_2)\}(\alpha_1-\alpha_0)$.

In accordance with the present invention, it is possible to expand the range of choices for the coefficient of thermal expansion. This is a substantial advantage in designing the process. Namely, it is possible to guarantee the reliability of an optical fiber irrespective of the coefficient of thermal expansion $\alpha_2$ of the soft UV curable resin by selecting the soft UV curable resin having a coefficient of thermal expansion $\alpha_1$ no higher than $(1-2\nu_1)/\Delta T$. Also, since there are determined the safe ranges of the coefficient of thermal expansion $\alpha_1$ of the soft UV curable resin and the coefficient of thermal expansion $\alpha_2$ of the rigid UV curable resin, it is possible to make selection of combinations of soft UV curable resins and rigid UV curable resins which have not been made prior to the present invention.

Accordingly, the present invention is particularly characteristic when the coefficient of thermal expansion $\alpha_1$ of the soft UV curable resin is selected near $\alpha_0$, for example, from $\alpha_0$ to 80% thereof. Namely, the coefficient of thermal expansion $\alpha_1$ should satisfy $$(1-2\nu_1)/120 > \alpha_1 > (1-2\nu_1)/150.$$

In usual cases, the range of the coefficient of thermal expansion $\alpha_1$ of the soft UV curable resin near $\alpha_0$ is not reliable. However, in accordance with the present invention, the reliability is guaranteed as described above. However, in the case where a soft UV curable resin can not be selected in order that the coefficient of thermal expansion $\alpha_1$ thereof is no higher than $\alpha_0$, a rigid UV curable resin is selected in order that the coefficient of thermal expansion $\alpha_2$ thereof is no lower than $R'(\alpha_1-\alpha_0)/(1+\nu_2)$ and no higher than 120% thereof, i.e., satisfying $$R'(\alpha_1-\alpha_0)/(1+\nu_2) < \alpha_2 < (6/5)\{R'(\alpha_1-\alpha_0)/(1+\nu_2)\}.$$

In this case,
$$\{0.8664/(1+\nu_2)\}(\alpha_1-\alpha_0) < \alpha_2 < \{1.03968/(1+\nu_2)\}(\alpha_1-\alpha_0)$$
should be satisfied. This range of $\alpha_2$ is also considered to be not reliable in usual cases. However, in accordance with the present invention, the reliability is guaranteed as described above.

For example, in the case of the exemplary implementation as described above, $\alpha_0$ is about $(4/3) \times 10^{-3}$ when the Poisson's ratio $\nu_1$ of said soft UV curable resin is 0.42 within a range of error. In this case, it is possible to make selection of combinations of soft UV curable resins and rigid UV curable resins which have not been realized prior to the present invention by selecting a soft UV curable resin to have a coefficient of thermal expansion $\alpha_1$ from $1.33 \times 10^{-3}$ to $1.07 \times 10^{-3}$.

Next, a further exemplary implementation of the present invention will be explained. In this case, it is assumed that the radius $R_0$ of the fiber glass structure 3 is 62.5 $\mu$m; that the outer radius $R_1$ of the first jacket layer 5 is 95 $\mu$m; that the outer radius $R_2$ of the second jacket layer 7 is 120 $\mu$m; and that the Poisson's ratio $\nu_2$ of said rigid UV curable resin is 0.45 to 0.49. Also, it is assumed that the radius $R_0$ of the fiber glass structure, the outer radius $R_1$ of the first jacket layer 5 and the outer radius $R_2$ of the second jacket layer 7 are accurate within ±0.3 $\mu$m respectively.

Also, in this case, the x-intercept $(\alpha_0)$ of the declined line as illustrated in FIG. 3 is determined by the Poisson's ratio $\nu_1$ and the deviation $\Delta T$ of the resin temperature of said UV curable resins from the temperature when the rigid UV curable resin starts hardening to the temperature when the hardening is finished, as $\alpha_0 = (1-2\nu_1)/\Delta T$. The x-intercept $(\alpha_0)$ can be handled in place of the Poisson's ratio $\nu_1$ and the deviation $\Delta T$ of the resin temperature. In the case where the Poisson's ratio $\nu_1$ is 0.42 to 0.47 and the deviation $\Delta T$ of the resin temperature of said UV curable resins from the temperature when the rigid UV curable resin starts hardening to the temperature when the hardening is finished is no higher than 180° C., the x-intercept $(\alpha_0)$ is about 3.0 to 2.2. On the other hand, the slope of the declined line as illustrated in FIG. 3 is $R'/(1+\nu_2)$ where $R'=(3/2)\{1+(R_0/R_1)^2\}$. Namely, the slope of the declined line is $0.8664/(1+\nu_2)$.

In this situation, the coefficient of thermal expansion is selected as follows. First, a soft UV curable resin is selected in order that the coefficient of thermal expansion $\alpha_1$ thereof is no higher than $\alpha_0$. Namely, the coefficient of thermal expansion $\alpha_1$ is selected to be no higher than $(1-2\nu_1)/\Delta T$. Accordingly, a soft UV curable resin is selected in order that the coefficient of thermal expansion $\alpha_1$ thereof is no higher than a value about from 8.9 to 3.3 corresponding to the Poisson's ratio $\nu_1$ from 0.42 to 0.47. However, in the case where a soft UV curable resin can not be selected in order that the coefficient of thermal expansion $\alpha_1$ thereof is no higher than $\alpha_0$, a rigid UV curable resin should be selected in order that the coefficient of thermal expansion $\alpha_2$ thereof is no lower than $R'(\alpha_1-\alpha_0)/(1+\nu_2)$, i.e., $\{0.8664/(1+\nu_2)\}(\alpha_1-\alpha_0)$.

In accordance with the present invention, it is possible to expand the range of choices for the coefficient of thermal expansion. This is a substantial advantage in designing the process. Namely, it is possible to guarantee the reliability of an optical fiber irrespective of the coefficient of thermal expansion $\alpha_2$ of the soft UV curable resin by selecting the soft UV curable resin having a coefficient of thermal expansion $\alpha_1$ no higher than $(1-2\nu_1)/\Delta T$. Also, since there are determined the safe ranges of the coefficient of thermal expansion $\alpha_1$ of the soft UV curable resin and the coefficient of thermal expansion $\alpha_2$ of the rigid UV curable resin, it is possible to make selection of combinations of soft UV curable resins and rigid UV curable resins which have not been made prior to the present invention.

Accordingly, the present invention is particularly characteristic when the coefficient of thermal expansion $\alpha_1$ of the soft UV curable resin is selected near $\alpha_0$, for example, from $\alpha_0$ to 80% thereof. Namely, the coefficient of thermal expansion $\alpha_1$ should satisfy $$(1-2\nu_1)/180 > \alpha_1 > (1-2\nu_1)/225.$$

In usual cases, the range of the coefficient of thermal expansion $\alpha_1$ of the soft UV curable resin near $\alpha_0$ is not reliable. However, in accordance with the present invention, the reliability is guaranteed as described above. However, in the case where a soft UV curable resin can not be selected in order that the coefficient of thermal expansion $\alpha_1$ thereof is no higher than $\alpha_0$, a rigid UV curable resin is selected in order that the coefficient of thermal expansion $\alpha_2$ thereof is no lower than $R'(\alpha_1-\alpha_0)/(1+\nu_2)$ and no higher than 120% thereof, i.e., satisfying $$R'(\alpha_1-\alpha_0)/(1+\nu_2) < \alpha_2 < (6/5)\{R'(\alpha_1-\alpha_0)/(1+\nu_2)\}.$$

In this case,
$$\{0.8664/(1+\nu_2)\}(\alpha_1-\alpha_0) < \alpha_2 < \{1.03968/(1+\nu_2)\}(\alpha_1-\alpha_0)$$
should be satisfied. This range of $\alpha_2$ is also considered to be not reliable in usual cases. However, in accordance with the present invention, the reliability is guaranteed as described above.

For example, in the case of the exemplary implementation as described above, $\alpha_0$ is about $8.9 \times 10^{-4}$ when the Poisson's ratio $\nu_1$ of said soft UV curable resin is 0.42 within a range of error. In this case, it is possible to make selection of combinations of soft UV curable resins and rigid UV curable resins which have not been realized prior to the present invention by selecting a soft UV curable resin to have a coefficient of thermal expansion $\alpha_1$ from $8.9\times10^{-4}$ to $7.1\times10^{-4}$.

Next, a further exemplary implementation of the present invention will be explained. In this case, it is assumed that the radius RD of the fiber glass structure 3 is 62.5 μm; that the outer radius $R_1$ of the first jacket layer 5 is 125 μm; that the outer radius $R_2$ of the second jacket layer 7 is 200 μm; and that the Poisson's ratio $v_2$ of said rigid UV curable resin is 0.45 to 0.49. Also, it is assumed that the radius RD of the fiber glass structure, the outer radius $R_1$ of the first jacket layer 5 and the outer radius $R_2$ of the second jacket layer 7 are accurate within ±0.3 μm respectively.

In this case, the x-intercept ($\alpha_0$) of the declined line as illustrated in FIG. 3 is determined by the Poisson's ratio $v_1$ and the deviation $\Delta T$ of the resin temperature of said UV curable resins from the temperature when the rigid UV curable resin starts hardening to the temperature when the hardening is finished, as $\alpha_0=(1-2v_1)/\Delta T$. The x-intercept ($\alpha_0$) can be handled in place of the Poisson's ratio $v_1$ and the deviation $\Delta T$ of the resin temperature. In the case where the Poisson's ratio $v_1$ is 0.42 to 0.47 and the deviation $\Delta T$ of the resin temperature of said UV curable resins from the temperature when the rigid UV curable resin starts hardening to the temperature when the hardening is finished is no higher than 120° C., the x-intercept ($\alpha_0$) is about 3.0 to 2.2. On the other hand, the slope of the declined line as illustrated in FIG. 3 is $R'/(1+v_2)$ where $R'=(3/2)\{1+(R_0/R_1)^2\}$. Namely, the slope of the declined line is $(8/15)/(1+v_2)$.

In this situation, the coefficient of thermal expansion is selected as follows. First, a soft UV curable resin is selected in order that the coefficient of thermal expansion $\alpha_1$ thereof is no higher than $\alpha_0$. Namely, the coefficient of thermal expansion $\alpha_1$ is selected to be no higher than $(1-2v_1)/\Delta T$. Accordingly, a soft UV curable resin is selected in order that the coefficient of thermal expansion $\alpha_1$ thereof is no higher than a value about from 8.9 to 3.3 corresponding to the Poisson's ratio $v_1$ from 3.0 to 2.2. However, in the case where a soft UV curable resin can not be selected in order that the coefficient of thermal expansion $\alpha_1$ thereof is no higher than $\alpha_0$, a rigid UV curable resin should be selected in order that the coefficient of thermal expansion $\alpha_2$ thereof is no lower than $R'(\alpha_1-\alpha_0)/(1+v_2)$, i.e., $15(\alpha_1-\alpha_0)/8(1+v_2)$.

In accordance with the present invention, it is possible to expand the range of choices for the coefficient of thermal expansion. This is a substantial advantage in designing the process. Namely, it is possible to guarantee the reliability of an optical fiber irrespective of the coefficient of thermal expansion $\alpha_2$ of the soft UV curable resin by selecting the soft UV curable resin having a coefficient of thermal expansion al no higher than $(1-2v_1)/6T$. Also, since there are determined the safe ranges of the coefficient of thermal expansion $\alpha_1$ of the soft UV curable resin and the coefficient of thermal expansion $\alpha_2$ of the rigid UV curable resin, it is possible to make selection of combinations of soft UV curable resins and rigid UV curable resins which have not been made prior to the present invention.

Accordingly, the present invention is particularly characteristic when the coefficient of thermal expansion $\alpha_1$ of the soft UV curable resin is selected near $\alpha_0$, for example, from $\alpha_0$ to 80% thereof. Namely, the coefficient of thermal expansion $\alpha_1$ should satisfy $$(1-2v_1)/120>\alpha_1>(1-2v_1)/150.$$

In usual cases, the range of the coefficient of thermal expansion $\alpha_1$ of the soft UV curable resin near $\alpha_0$ is not reliable. However, in accordance with the present invention, the reliability is guaranteed as described above. However, in the case where a soft UV curable resin can not be selected in order that the coefficient of thermal expansion $\alpha_1$ thereof is no higher than $\alpha_0$, a rigid UV curable resin is selected in order that the coefficient of thermal expansion $\alpha_2$ thereof is no lower than $R'(\alpha_1-\alpha_0)/(1+v_2)$ and no higher than 120% thereof, i.e., satisfying $$R'(\alpha_1-\alpha_0)/(1+v_2)<\alpha_2<(6/5)\{R'(\alpha_1-\alpha_0)/(1+v_2)\}.$$

In this case, $$15(\alpha_1-\alpha_0)/8(1+v_2)<\alpha_2<9(\alpha_1-\alpha_0)/4(1+v_2)$$

should be satisfied. This range of $\alpha_2$ is also considered to be not reliable in usual cases. However, in accordance with the present invention, the reliability is guaranteed as described above.

For example, in the case of the exemplary implementation as described above, $\alpha_0$ is about $(4/3)\times10^{-3}$ when the Poisson's ratio $v_1$ of said soft UV curable resin is 0.42 within a range of error. In this case, it is possible to make selection of combinations of soft UV curable resins and rigid UV curable resins which have not been realized prior to the present invention by selecting a soft UV curable resin to have a coefficient of thermal expansion $\alpha_1$ from $1.33\times10^{-3}$ to $1.07\times10^{-3}$.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. An optical fiber comprising:
   a fiber glass structure;
   a first jacket layer made of a soft curable resin and directly covering the external surface of said fiber glass structure; and
   a second jacket layer made of a rigid curable resin and covering the external surface of said fiber glass structure through said first jacket layer,
   wherein the mechanical factors of said fiber glass structure, the mechanical factors of said first jacket layer and the mechanical factors of said second jacket layer are selected in order that the Young's modulus of said first jacket layer is larger than the average tensile stress $(\sigma_r+\sigma_\theta+\sigma_z)/3$ as applied to said first jacket layer while a resin temperature of the curable resins falls from a temperature when the rigid curable resin starts hardening to a temperature when the hardening is finished.

2. The optical fiber as set forth in claim 1 wherein the mechanical factors of said fiber glass structure includes the radius of said fiber glass structure; the mechanical factors of said first jacket layer includes the outer radius of said first jacket layer, the Young's modulus, the coefficient of thermal expansion and the Poisson's ratio of said soft curable resin; and the mechanical factors of said second jacket layer includes the outer radius of said second jacket layer, the Young's modulus, the coefficient of thermal expansion and the Poisson's ratio of said rigid curable resin.

3. The optical fiber as set forth in claim 1 wherein said soft curable resin comprises a soft UV curable resin and said rigid curable resin comprises a rigid UV curable resin.

4. An optical fiber cable in which a plurality of optical fibers is bundled, each of said optical fibers comprising:
a fiber glass structure;
a first jacket layer made of a soft curable resin and directly covering the external surface of said fiber glass structure; and
a second jacket layer made of a rigid curable resin and covering the external surface of said fiber glass structure through said first jacket layer,
wherein the mechanical factors of said fiber glass structure, the mechanical factors of said first jacket layer and the mechanical factors of said second jacket layer are selected in order that the Young's modulus of said first jacket layer is larger than the average tensile stress $(\sigma_r+\sigma_\theta+\sigma_z)/3$ as applied to said first jacket layer while a resin temperature of the curable resins falls from a temperature when the rigid curable resin starts hardening to a temperature when the hardening is finished.

5. A method of manufacturing an optical fiber comprising: a fiber glass structure; a first jacket layer made of a soft curable resin and directly covering the external surface of said fiber glass structure; and a second jacket layer made of a rigid curable resin and covering the external surface of said fiber glass structure through said first jacket layer,
wherein the mechanical factors of said fiber glass structure, the mechanical factors of said first jacket layer and the mechanical factors of said second jacket layer are selected in order that the Young's modulus of said first jacket layer is larger than the average tensile stress $(\sigma_r+\sigma_\theta+\sigma_z)/3$ as applied to said first jacket layer while a resin temperature of the curable resins falls from a temperature when the rigid curable resin starts hardening to a temperature when the hardening is finished.

6. The method of manufacturing an optical fiber as set forth in claim 5 wherein the mechanical factors of said fiber glass structure includes the radius of said fiber glass structure; the mechanical factors of said first jacket layer includes the outer radius of said first jacket layer, the Young's modulus, the coefficient of thermal expansion and the Poisson's ratio of said soft curable resin; and the mechanical factors of said second jacket layer includes the outer radius of said second jacket layer, the Young's modulus, the coefficient of thermal expansion and the Poisson's ratio of said rigid curable resin.

7. The method of manufacturing an optical fiber as set forth in claim 5 wherein said soft curable resin comprises a soft UV curable resin and said rigid curable resin comprises a rigid curable resin.

8. An optical fiber comprising:
a fiber glass structure;
a first jacket layer made of a soft curable resin and directly covering the external surface of said fiber glass structure; and
a second jacket layer made of a rigid curable resin and covering the external surface of said fiber glass structure through said first jacket layer,
wherein, in the case where the Young's modulus of said soft curable resin is small as compared to the Young's modulus of said rigid curable resin, the coefficient of thermal expansion a1 of said soft curable resin and the coefficient of thermal expansion $\alpha_2$ of said rigid curable resin satisfy $$\alpha_2 > \frac{3}{2(1+v_2)}\left\{1-\left(\frac{R_0}{R_1}\right)^2\right\}\left\{\alpha_1 - \frac{1-2v_1}{\Delta T}\right\}$$

where $R_0$ is the radius of the fiber glass structure, $R_1$ is the outer radius of the first jacket layer, $v_1$ is the Poisson's ratio of the soft curable resin, $v_2$ is the Poisson's ratio of the rigid curable resin, and $\Delta T$ is a deviation of a resin temperature of said curable resins from a temperature when the rigid curable resin starts hardening to a temperature when the hardening is finished.

9. The optical fiber as set forth in claim 8 wherein said soft curable resin comprises a soft UV curable resin and said rigid curable resin comprises a rigid curable resin.

10. An optical fiber cable in which a plurality of optical fibers is bundled, each of said optical fibers comprising:
a fiber glass structure;
a first jacket layer made of a soft curable resin and directly covering the external surface of said fiber glass structure; and
a second jacket layer made of a rigid curable resin and covering the external surface of said fiber glass structure through said first jacket layer,
wherein, in the case where the Young's modulus of said soft curable resin is small as compared to the Young's modulus of said rigid curable resin, the coefficient of thermal expansion $\alpha_1$, of said soft curable resin and the coefficient of thermal expansion $\alpha_2$ of said rigid curable resin satisfy $$\alpha_2 > \frac{3}{2(1+v_2)}\left\{1-\left(\frac{R_0}{R_1}\right)^2\right\}\left\{\alpha_1 - \frac{1-2v_1}{\Delta T}\right\}$$

where $R_0$ is the radius of the fiber glass structure, $R_1$ is the outer radius of the first jacket layer, $v_1$ is the Poisson's ratio of the soft curable resin, $v_2$ is the Poisson's ratio of the rigid curable resin, and $\Delta T$ is a deviation of a resin temperature of said curable resins from a temperature when the rigid curable resin starts hardening to the a temperature when the hardening is finished.

11. A method of manufacturing an optical fiber comprising: a fiber glass structure; a first jacket layer made of a soft curable resin and directly covering the external surface of said fiber glass structure; and a second jacket layer made of a rigid curable resin and covering the external surface of said fiber glass structure through said first jacket layer,
wherein, in the case where the Young's modulus of said soft curable resin is small as compared to the Young's modulus of said rigid curable resin, the coefficient of thermal expansion $\alpha_1$ of said soft curable resin and the coefficient of thermal expansion $\alpha_2$ of said rigid curable resin are selected to satisfy $$\alpha_2 > \frac{3}{2(1+v_2)}\left\{1-\left(\frac{R_0}{R_1}\right)^2\right\}\left\{\alpha_1 - \frac{1-2v_1}{\Delta T}\right\}$$

where $R_0$ is the radius of the fiber glass structure, $R_1$ is the outer radius of the first jacket layer, $v_1$ is the Poisson's ratio of the soft curable resin, $v_2$ is the Poisson's ratio of the rigid curable resin, and $\Delta T$ is a deviation of a resin temperature of said curable resins from a temperature when the rigid curable resin starts hardening to a temperature when the hardening is finished.

12. The method of manufacturing an optical fiber as set forth in claim 11 wherein said soft curable resin comprises a soft UV curable resin and said rigid curable resin comprises a rigid curable resin.

13. An optical fiber comprising:

a fiber glass structure;

a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is less than the Young's modulus of said rigid curable resin, wherein the radius $R_0$ of said fiber glass structure is approximately 62.5 μm; that the outer radius $R_1$ of said first jacket layer is approximately 125 μm; that the outer radius $R_2$ of said second jacket layer is approximately 200 μm; that the Poisson's ratio of said soft curable resin is approximately $v_1$; and that a deviation of a resin temperature of said curable resins from a temperature when the rigid curable resin starts hardening to a temperature when the hardening is finished is $\Delta T$;

and wherein said soft curable resin is selected in order to have a coefficient of thermal expansion which is no higher than $(1-2v_1)/\Delta T$.

14. An optical fiber comprising:

a fiber glass structure;

a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is less than the Young's modulus of said rigid curable resin, wherein the radius $R_0$ of said fiber glass structure is approximately 62.5 μm; that the outer radius $R_1$ of said first jacket layer is approximately 125 μm; that the outer radius $R_2$ of said second jacket layer is approximately 200 μm; error; that the Poisson's ratio of said soft curable resin is approximately $v_1$; and that a deviation of a resin temperature of said curable resins from a temperature when the rigid curable resin starts hardening to a temperature when the hardening is finished is $\Delta T$, and wherein said soft curable resin is selected in order to have a coefficient of thermal expansion satisfying $(1-2v_1)/180 > \alpha_1 > (1-2v_1)/225$.

15. An optical fiber comprising:

a fiber glass structure;

a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is less than the Young's modulus of said rigid curable resin, wherein the radius $R_0$ of said fiber glass structure is approximately 62.5 μm; that the outer radius $R_1$ of said first jacket layer is approximately 125 μm; that the outer radius $R_2$ of said second jacket layer is approximately 200 μm; that the Poisson's ratio of said soft curable resin is approximately $v_1$; that the Poisson's ratio of said rigid curable resin is approximately $v_2$; and that a deviation of a resin temperature of said curable resins from a temperature when the rigid curable resin starts hardening to a temperature when the hardening is finished is $\Delta T$, and wherein said soft curable resin is selected in order to have a coefficient of thermal expansion which is no higher than of $\alpha_0 = (1-2v_1)/\Delta T$ and said rigid curable resin is selected in order to have a coefficient $\alpha_2$ of thermal expansion satisfying $15(\alpha_1-\alpha_0)/8(1+v_2) < \alpha_2 < 9(\alpha_1-\alpha_0)/4(1+v_2)$.

16. An optical fiber comprising:

a fiber glass structure;

a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is less than the Young's modulus of said rigid curable resin, wherein the radius $R_0$ of said fiber glass structure is approximately 62.5 μm; that the outer radius $R_1$ of said first jacket layer is approximately 95 μm; that the outer radius $R_2$ of said second jacket layer is approximately 120 μm; that the Poisson's ratio of said soft curable resin is approximately $v_1$ and that a deviation of a resin temperature of said curable resins from a temperature when the rigid curable resin starts hardening to a temperature when the hardening is finished is $\Delta T$, and wherein said soft curable resin is selected in order to have a coefficient of thermal expansion which is no higher than $(1-2v_1)/\Delta T$.

17. An optical fiber comprising:

a fiber glass structure;

a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is less than the Young's modulus of said rigid curable resin, wherein the radius $R_0$ of said fiber glass structure is approximately 62.5 μm; that the outer radius $R_1$ of said first jacket layer is approximately 95 μm; that the outer radius $R_2$ of said second jacket layer is approximately 120 μm; that the Poisson's ratio of said soft curable resin is approximately $v_1$; and that a deviation of a resin temperature of said curable resins from a temperature when the rigid curable resin starts hardening to a temperature when the hardening is finished is $\Delta T$, and wherein said soft curable resin is selected in order to have a coefficient of thermal expansion satisfying $(1-2v_1)/120 > \alpha_1 > (1-2v_1)/150$.

18. An optical fiber comprising:

a fiber glass structure;

a first jacket layer made of a soft curable resin and directly covering the external surface of said fiber glass structure; and a second jacket layer made of a rigid curable resin and covering the external surface of said fiber glass structure through said first jacket layer, wherein the Young's modulus of said soft curable resin is less than the Young's modulus of said rigid curable resin, wherein the radius $R_0$ of said fiber glass structure is approximately 62.5 μm; that the outer radius $R_1$ of said first jacket layer is approximately 95 μm; that the outer radius $R_2$ of said second jacket layer is approximately 120 μm; that the Poisson's ratio of said soft curable resin is approximately $v_1$; that the Poisson's ratio of said rigid curable resin is approximately $v_2$; and that a deviation of a resin temperature of said curable resins from a temperature when the rigid curable resin starts hardening to a temperature when the hardening is finished is $\Delta T$, and wherein said soft curable resin is selected in order to have a coefficient of thermal expansion which is no higher than $\alpha_0 = (1-2v_1)/\Delta T$ and said rigid curable resin is selected in order to have a coefficient $\alpha_2$ of thermal expansion satisfying $$\{0.8664/(1+v_2)\}(\alpha_1-\alpha_0) < \alpha_2 < \{1.03968/(1+v_2)\}(\alpha_1-\alpha_0).$$

* * * * *